(12) United States Patent
Pearlman

(10) Patent No.: US 7,579,542 B2
(45) Date of Patent: Aug. 25, 2009

(54) FINGERING GUIDE FOR STRING INSTRUMENT (FINGER FINDER)

(76) Inventor: Edward S Pearlman, 76 Pine St., South Portland, ME (US) 04106

( * ) Notice: Subject to any disclaimer, the term of this patent is extended or adjusted under 35 U.S.C. 154(b) by 0 days.

(21) Appl. No.: 12/231,731

(22) Filed: Sep. 5, 2008

(65) Prior Publication Data

US 2009/0095142 A1 Apr. 16, 2009

Related U.S. Application Data

(60) Provisional application No. 60/998,535, filed on Oct. 11, 2007.

(51) Int. Cl.
*G09B 15/02* (2006.01)
(52) U.S. Cl. ..................... 84/473; 84/471 SR
(58) Field of Classification Search ................... 84/473, 84/471 SR, 470 R, 471, 485 SR
See application file for complete search history.

(56) References Cited

U.S. PATENT DOCUMENTS

| | | | | | |
|---|---|---|---|---|---|
| 1,300,193 | A | * | 4/1919 | Raff | 84/485 R |
| 2,941,436 | A | * | 6/1960 | Ericksen | 84/473 |
| 3,554,074 | A | * | 1/1971 | Rickey | 84/485 R |
| 3,668,967 | A | * | 6/1972 | Malis | 84/471 R |
| 3,728,930 | A | * | 4/1973 | Maron | 84/471 R |
| 3,748,947 | A | * | 7/1973 | Freiheit | 84/485 R |
| 3,771,409 | A | * | 11/1973 | Rickey | 84/471 R |
| 4,969,383 | A | * | 11/1990 | Bezeau, Jr. | 84/485 SR |
| 5,386,757 | A | * | 2/1995 | Derrick | 84/473 |
| 5,410,940 | A | * | 5/1995 | Havas | 84/473 |
| 5,429,029 | A | * | 7/1995 | Mendiola, Jr. | 84/471 R |
| 5,524,522 | A | * | 6/1996 | Hesnan | 84/473 |
| 6,080,925 | A | * | 6/2000 | Rogers et al. | 84/485 R |
| 6,483,018 | B2 | * | 11/2002 | Mead | 84/477 R |
| 7,115,806 | B2 | * | 10/2006 | Holland | 84/454 |
| 7,332,665 | B2 | * | 2/2008 | Haney | 84/470 R |
| 7,427,704 | B2 | * | 9/2008 | Huwaldt | 84/314 R |
| 2002/0096036 | A1 | * | 7/2002 | Tan | 84/471 R |
| 2009/0095142 | A1 | * | 4/2009 | Pearlman | 84/473 |

* cited by examiner

*Primary Examiner*—Jeffrey Donels
*Assistant Examiner*—Robert W Horn

(57) ABSTRACT

An instructional and reference device, for use by violinists, violists, and cellists, is constructed using an outer sleeve or pocket with a sliding panel. The outer sleeve has a larger and a smaller opening, each positioned to reveal information imprinted on the sliding panel. The information revealed through the smaller opening may include musical keys and key signatures. The outer sleeve is imprinted with the names of the strings above the larger opening, through which is revealed the appropriate fingering used on each string when playing in the musical key displayed in the smaller opening of the outer sleeve. Several different inner panels can be used in this musical slide rule, making available fingering information relevant to violin, viola, cello, and/or variants thereof, for different hand positions on these instruments; different inner panels can be used to display fingering information for various positions on the fingerboards of these instruments. Fingering for classical scales of major and minor keys for various modes, and ethnic and stylistic scale patterns, such as are used in jazz, blues, and musical styles native to subcultures around the world may be provided. The inner panel displays the numbers of the appropriate fingers on each string, their relative spacing on each string in each selected musical key, and through various colors or other means may indicate the locations of the root notes of each major and minor key, and arpeggio notes.

16 Claims, 4 Drawing Sheets

Front view of Finger Finder, fingering guide for string instruments of the violin family Front view of Finger Finder,
fingering guide for string instruments of the violin family Full view of inner slide of Finger Finder Rear view of Finger Finder,
fingering guide for string instruments of the violin family Cross-sectional view of Finger Finder,
fingering guide for string instruments of the violin family Variant of Finger Finder adapted for violin and viola

FINGERING GUIDE FOR STRING INSTRUMENT (FINGER FINDER)

REFERENCE TO RELATED APPLICATION

This patent application is related to and claims the benefit of provisional application No. 60/998,535 filed on Oct. 11, 2007.

FIELD OF INVENTION

The invention pertains to teaching and learning aids for musical instruments. More particularly, the invention relates to a device for helping violinists, violists and cellists determine where to place their fingers on each string when playing in each major or minor key, as well as how to find the chord or arpeggio notes of each major key. The invention also provides help, through the use of a a selected sleeve, slide or cursor, in determining the finger position used in various hand positions, and scale patterns used in various styles of musical performance.

BACKGROUND OF THE INVENTION

The violin, viola, and cello produce a variety of musical pitches through the placement of fingers on the strings. Placing a finger on a string raises the pitch of the string by shortening its length as it vibrates. These instruments do not use frets to delineate necessary positions of the fingers, but like fretted instruments, the stop positions for higher pitches become progressively closer. Correct positioning of fingers is accomplished through muscle memory, in particular, knowing whether there is a space between two fingers or not as they are placed on the string. Understanding these relationships is essential to playing the instrument well, and basic learning of the correct positions is usually accomplished through intensive drills in each of the standard hand positions up the neck, while a knowledge of theory allows the player to deduce the correct fingering, albeit more slowly, from first principles.

There are 12 distinct notes in western music; each note is the root of a major and minor scale. These scales are experienced aurally because of specific relationships between the notes in each scale. Modes other than major and minor, and scale patterns from both western and nonwestern music, have their own specific note relationships.

In the field of musical pedagogy various hand-held devices, including musical slide rules, have been developed for assisting musicians and teachers to determine notes and chords for the piano, guitar, and general music theory.

U.S. Pat. No. 395,067 issued to Maggs in 1888 for a guide to pianists seeking the right notes to play in various musical keys, using a representation of a piano keyboard and sliding cards.

U.S. Pat. No. 675,345 issued to Bauer in 1901 for a slide rule device which indicated the names of notes that form various chords in the musical keys selected by the user.

U.S. Pat. No. 2,938,421 issued to Leonard in 1960 for a teaching aid for learning piano, involving a chart with sliding cards and a circular slide rule showing the names of notes in various chords U.S. Pat. No. 3,668,967 issued to Malis in 1972 for a sliding mechanism used to find the names and positions of notes on the guitar within selected chords.

U.S. Pat. No. 3,728,931 issued to Leonard in 1973 for a device indicating musical notation and names of notes and chords as related to playing them on the piano, using a sliding mechanism.

U.S. Pat. No. 4,960,029 issued to Nelson in 1990 for a slide rule showing the names of notes in various musical scales.

U.S. Pat. No. 5,386,757 issued to Derrick in 1995 for a slide rule helping guitarists find the placement of notes in various chords along the fingerboard of the guitar.

U.S. Pat. No. 6,323,410 issued to Rackow in 2001 for a slide rule indicating the names of notes in various musical scales.

U.S. Pat. No. 6,969,793 issued to Kerkhoff in 2003 for a slide rule helping pianists find chords and notes on the piano.

U.S. Pat. No. 7,345,236 issued to Worrall in 2008 for a computing system to calculate fingering positions for an inputted composition.

As described more fully below, the present invention provides a hand-held musical reference guide for an instrument of the violin family, and presents a visual map of the finger positions and their relationships in each musical key, as played on the fretless instruments of the violin family. The invention includes printed components which together display the possible positions for each finger, and within those positions, said invention indicates the appropriate positions for each finger within each musical key, allowing the user to play a major or minor scale in every key. While the invention may be implemented with various cursor or sliding elements, preferably the invention is implemented by a first component, which is a pocket or sleeve having one or more windows, and a second component which is a sliding card having information or indicia visible through the window(s). Additional inner cards allow the user to properly place the fingers in positions higher up the neck, and for modes and scale patterns other than major or minor.

The slide rule nature of the invention is made possible by the fact that the key signatures in western music are traditionally organized as a cycle of fifths, meaning that the root note of each key is five notes away from root note of the neighboring key, a "neighboring key" being the musical key with one more or one fewer sharps or flats than the original key.

The strings of the violin family instruments are also organized in fifths, with each string five notes away from its neighboring string. Because of this, fingering patterns for one musical key are very similar to fingering patterns for the neighboring key, the difference between the two keys primarily requiring that the fingering pattern shift over by one string. This consistency gives rise to the opportunity to represent all of the common fingering patterns for all the musical keys on a single slide rule, with each fingering pattern shifting over one string each time the inner slide member is moved to reveal an adjacent key, which is offset by one fifth.

Musicians working with instruments of the violin family must learn the spacing and relationships of the finger positions in the many musical keys. For many players, a visual representation of these patterns is very helpful; it is especially useful to have all the needed patterns and keys available for reference in a single fingering guide, as accomplished by this invention.

SUMMARY OF THE INVENTION

As claimed, the present invention meets the above-mentioned need in a design that is easy to use and economical to construct. An outer sleeve has a first window and a second, illustratively larger window, and a card or sliding member bearing music indicia slides within the sleeve to reveal certain indicia or data in the two windows. The images or data on the sliding member are positioned such that the data or image appearing in the first window corresponds to the data or image appearing in the second window. In one embodiment the two sets of data are key signatures and the notes, chords and/or the fingering for notes and chords associated with the key signatures. The user of the invention can select a key or key signature by sliding the inner slide member inside the outer sleeve in order to reveal in the smaller opening in the outer sleeve the desired key or key signature, whereupon circles, numbers and colors revealed in the larger opening will align underneath the names of the four strings as printed above the larger opening on the outer sleeve, providing a clear visual indication to the user as to where to put the fingers on each string in order to play the notes appropriate to the musical key selected by the user.

The outer sleeve is preferably closed at one end, adding to the strength of the outer sleeve, and forming a pocket which slideably holds the inner card, thus minimizing the chance of losing the inner sliding card. The user simply slides the inner slide member out to select information for a desired musical key, and uses the finger positioning shown in the larger opening as a guide for the placement of fingers in that key. Predetermined colors may be used to indicate essential information about root notes for major and minor keys, and about arpeggio or chordal notes within the selected key.

The invention can be economically constructed via the printing, cutting and folding of two sheets of semi-rigid or stiff paper, or card stock, or may be cut from harder more durable materials such as a stiff polymer, metal plate or sheet of wood, as was commonly done for fabricating slide rules and other mechanical measuring or calculating devices. The invention is large enough to permit easy reading of its information, yet small and light enough to allow for practical transportation and storage for musicians and teachers. A plastic- or film-coated card stock is preferred for its light weight, durability and ease of storage and transport.

Information for fingering patterns on violin, viola and cello, and for various hand positions of each instrument can be represented on the front and back of the inner sliding card, or on the front surface only. Further several separate inner cards may be provided to aid musicians interested in visual aids for learning scale patterns geared especially towards nonclassical or nonwestern patterns, such as may be used, for example, in jazz, Celtic, klezmer, Indian or Middle Eastern music.

In addition, the card and sleeve may be configured to provide fingering information for more than one instrument, such as the combination violin/viola configuration illustrated in FIG. 4. The card and sleeve may also provide fingering information for the mandolin, which is tuned to the same pitches as the violin, and can be fingered in the same way, although it is a plucked, fretted instrument.

DETAILED DESCRIPTION

Figure 1:
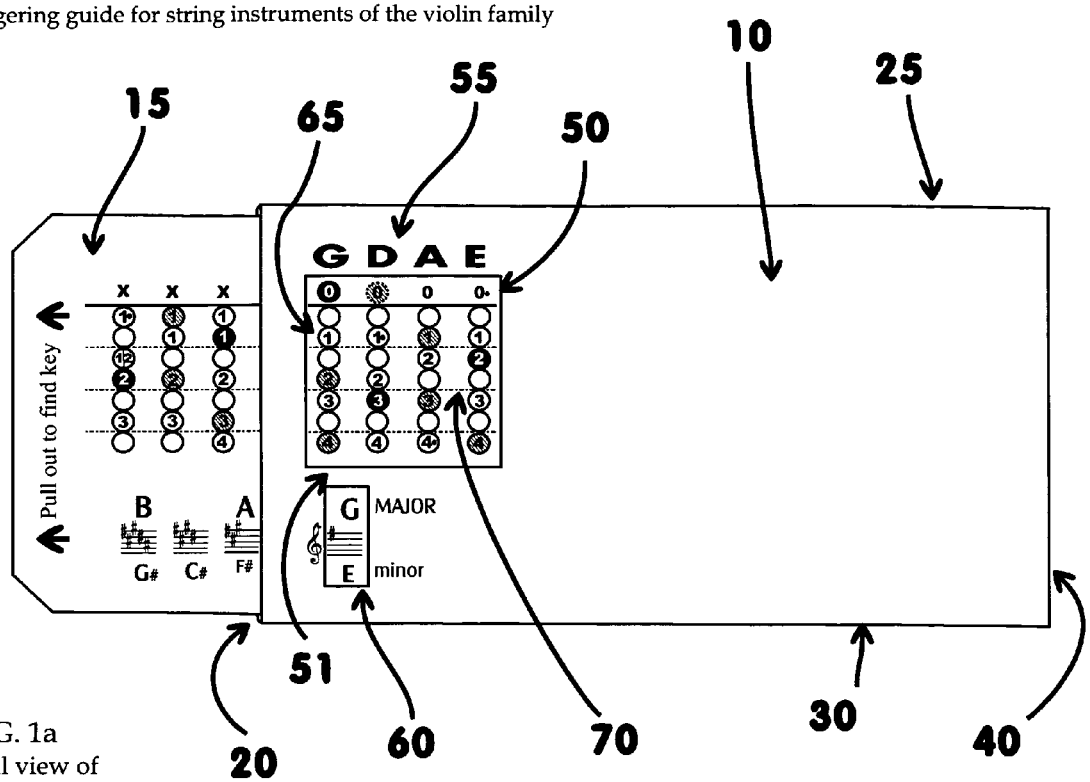
FIG. 1 shows the front of the fingering guide for string instruments, referred to in the figure caption as the Finger Finder and comprising outer sleeve 10 and an inner card 15 assembled as a unit.
Figure 1A:
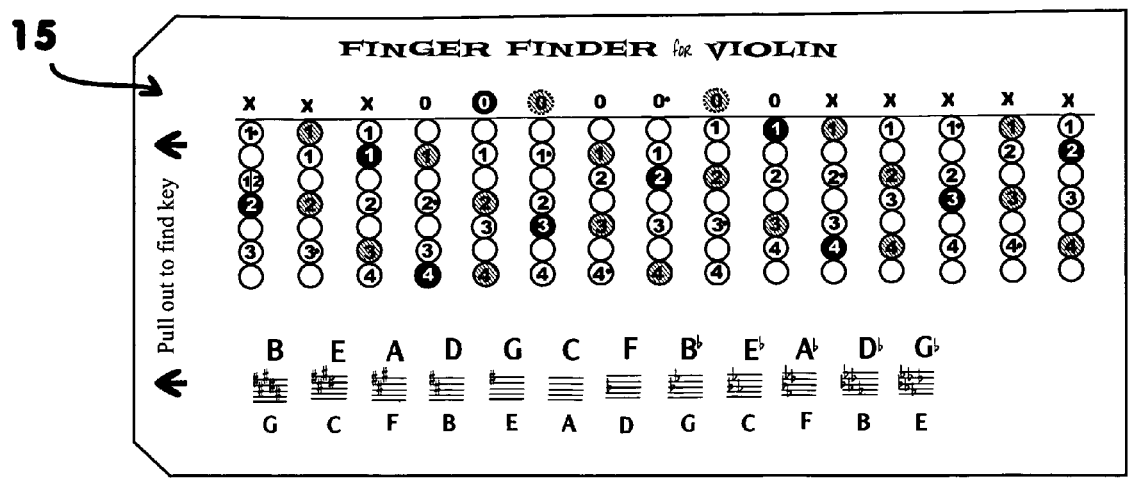
FIG. 1a shows the full view of one embodiment of the inner card for use with a violin. The inner card can be printed on both sides, or alternate inner cards can provide additional information for use in the outer sleeve. The larger opening 50 and the smaller opening 60 are shown.
Figure 2:
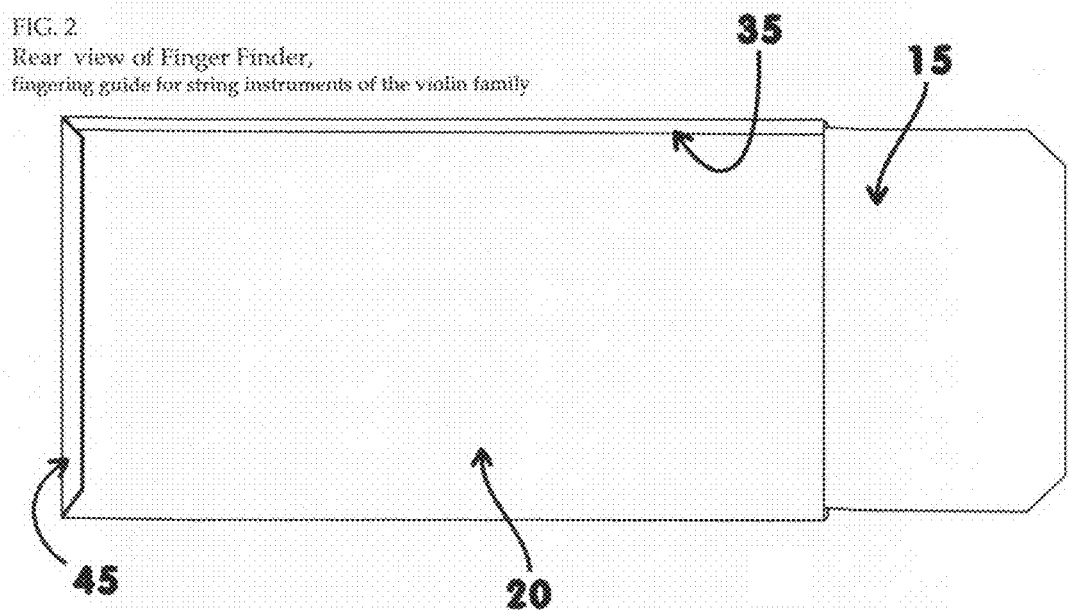
FIG. 2 shows the rear view of the fingering guide for string instruments. The outer sleeve 20 and inner slide member 15 are shown, along with the flap 45 folded over from the front, closing one side of the outer sleeve. The sheet material from which the outer sleeve is constructed is folded at top and bottom and attached 35 on the back surface of the fingering guide
Figure 3:
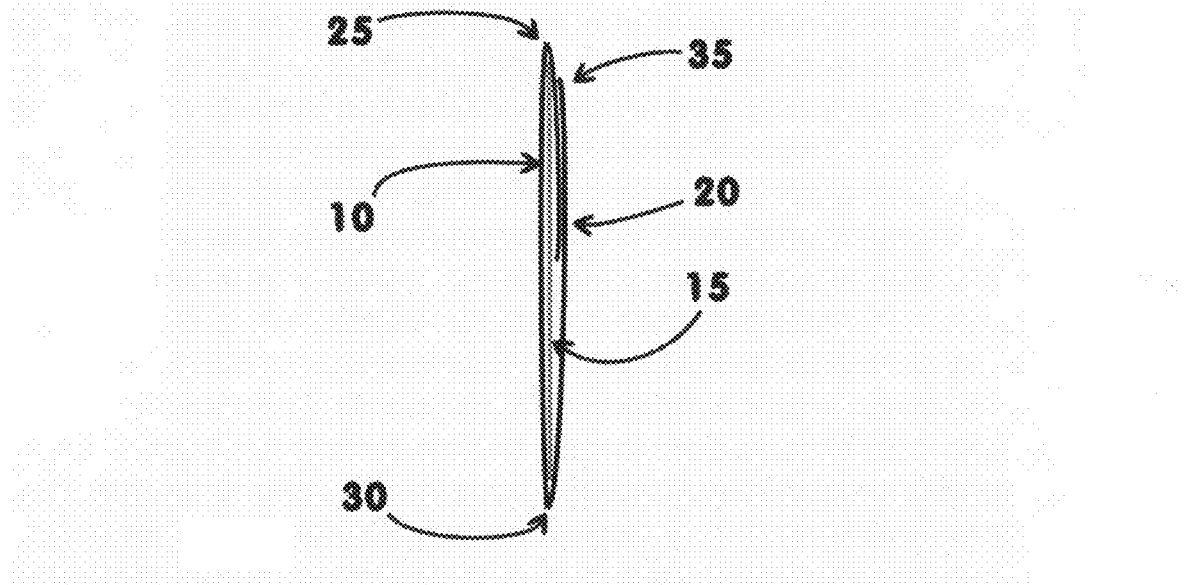
FIG. 3 shows a cross-sectional view of the fingering guide for string instruments. The front 10 and back 20 of the outer sleeve, and the inner slide member 15, are all flat, the folds at top 25 and bottom 30 of the outer sleeve being creased as flat as possible and attached 35 on the back, allowing only enough space in the inner cavity for the inner slide member to move snugly in and out of the outer sleeve.

FIGS. 1, 1A and 2 illustrate a fingering guide for string instruments showing the outer sleeve 10 and the inner slide member 15 partially pulled out during use. The front 10 and back 20 surfaces of the outer sleeve are folded at top 25 and bottom 30 and attached on back 35, leaving one side 20 open to form an inner cavity in which the slide member 15 moves. The other side 40 is closed by means of a flap folded over to the back and attached 45.

Further, in FIG. 1 can be seen the larger opening 50 cut into the front surface of the outer sleeve 10, revealing information imprinted on the slide member 15. Imprinted on the outer sleeve are the names of the strings 55 directly above the larger opening 50. Imprinted on the sliding inner card are correlated sets of musical information, arranged such that the fingering positions are printed in a band extending across the upper portion of the card, and the musical key names and key signatures are printed in a band extending across the lower portion of the card. The fingering positions and the keys and key signatures are arranged such that the fingering positions visible in the larger opening 50 correspond to the musical key revealed in the smaller opening 60. In the larger opening 50 can be seen the circular shapes, some with numbers and predetermined colors 65 vertically aligned under the name of the string 55. These circular shapes, numbers and colors indicate the appropriate fingering and locations of root and arpeggio notes for the key selected in the smaller window 60. Other shapes, such as squares, diamonds, or the like, could be used to indicate finger positions. Horizontal lines 70 help the user visualize the one or two positions covered by each numbered finger in the selected key.

The windows 50,60 need not be separate punchouts with a band of sleeve material 51 remaining between them, but may be a single irregularly shaped punchout having the two open areas 50, 60.

The blank spaces on both sides of the outer sleeve 10, 20, are preferably filled with text providing helpful hints and pedagogical explanations, which may be edited to provide improved assistance to users.

In one exemplary embodiment the following interpretive notes appear on the front of the outer sleeve:

Blue-colored notes are major key root notes—e.g., the Ds in the key of D

Red dots indicate root notes of minor scales

Yellow-colored notes are chord (arpeggio) notes in the major key.

Please Turn Over for info on fingering keys with $6^b$s, $7^b$s, 7#s, and for some Helpful Hints about using this gadget.

Correspondingly, the back of the outer sleeve reads as follows:

For F# Major (D# minor), use Gb Major chart for finger position, but reduce finger number by 1.

For C# Major (A# minor), use Db Major chart for finger position, but reduce finger number by 1.

For C# Major (A# minor), use B Major chart for finger position, but increase finger number by 1.

Helpful Hints:

After finding the name of the key or the key signature in the small window, here are some tips for using the information in the large window:

Scales—play all the notes starting and ending with the blue notes. (Minor scales start and end on red-dot notes.) Leave a finger-width space where there is an empty circle, and don't use the open string if it's marked with an 'X'. Notice where the half-steps are—where two fingers are touching; in most keys there's only one on each string. Notice also which fingers stay in the same position across all the strings, and which finger or fingers change position from one string to the next.

Arpeggios—start and end on a blue note but play only the 2 yellow notes in between. These are the first, third, and fifth notes of the scale. Most musical passages are built with scales and arpeggios.

Finger positions—a light horizontal line helps mark the territories of each finger. Most of the time, each finger has responsibility for two positions, the numbered one being used in the key shown in the small window, and the empty circle used by that finger in the case of an accidental (an extra # or ☐ not shown in the key signature). When using the 3d position card, note that the 1st finger is placed where the 3d finger in 1st position would be—the heavy dotted line marks the edge of 3d position (the border in 1st position between 2d and 3d fingers).

Figure 6:
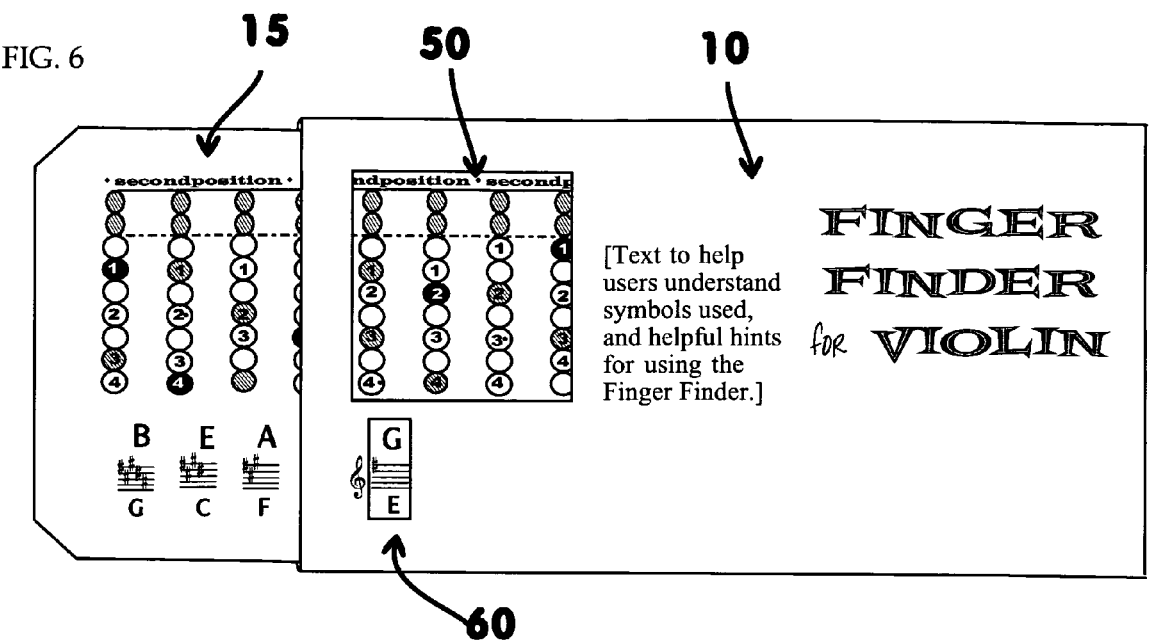
FIG. 6 shows the fingering guide for violin with a sliding card 15 that provides information about the placement of fingers in second position. The outer sleeve 10, the window to show needed fingering information 50 and the key and key signature information 60, are arranged as in other variants of the fingering guide.
Figure 7:
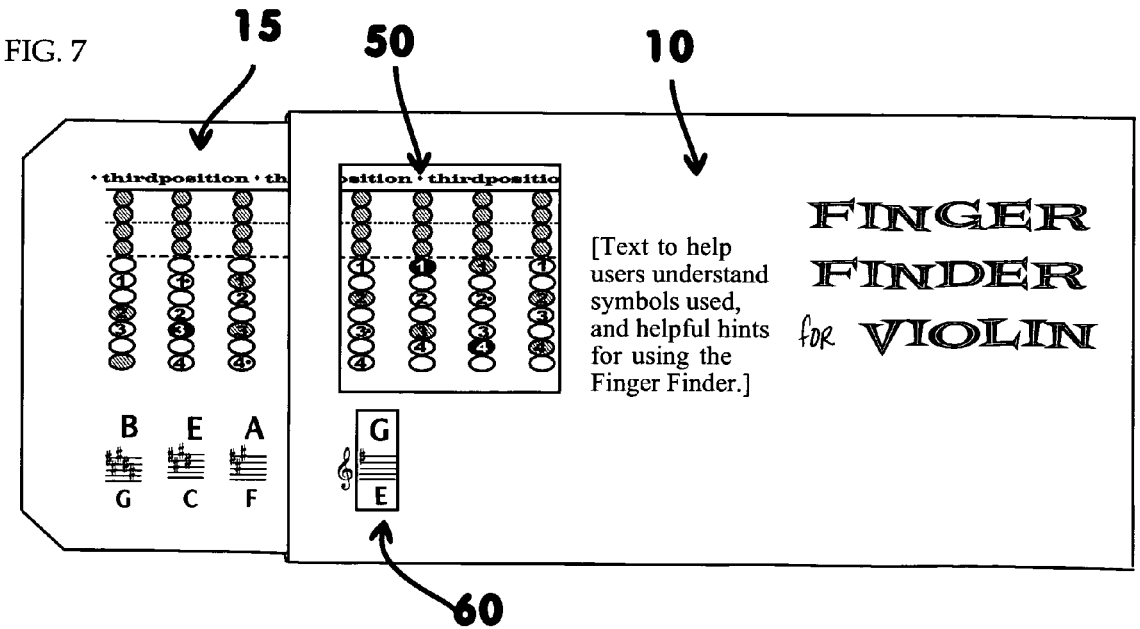
FIG. 7 shows the fingering guide for violin with a sliding card 15 that provides information about the placement of fingers in third position. The outer sleeve 10, the window to show needed fingering information 50 and the key and key signature information 60, are arranged as in other variants of the fingering guide.

Applicant presently contemplates at least the following principal instrument-specific embodiments of the invention:

1. Finger Finder for Violin, including a card for 1st position fingering, and a double-sided card for 2d & 3d position fingerings. FIGS. 6 and 7 demonstrate the appearance of the Finger Finder when the 2d position fingering card (FIG. 6) and the 3d position fingering card (FIG. 7) are in use.

2. Finger Finder for Fiddle & Mandolin, with only the card for 1st position, and text and graphics suggesting the frets for mandolin players, as well as helpful tips about using the fingering information on the card to play mandolin chords.

Figure 4:
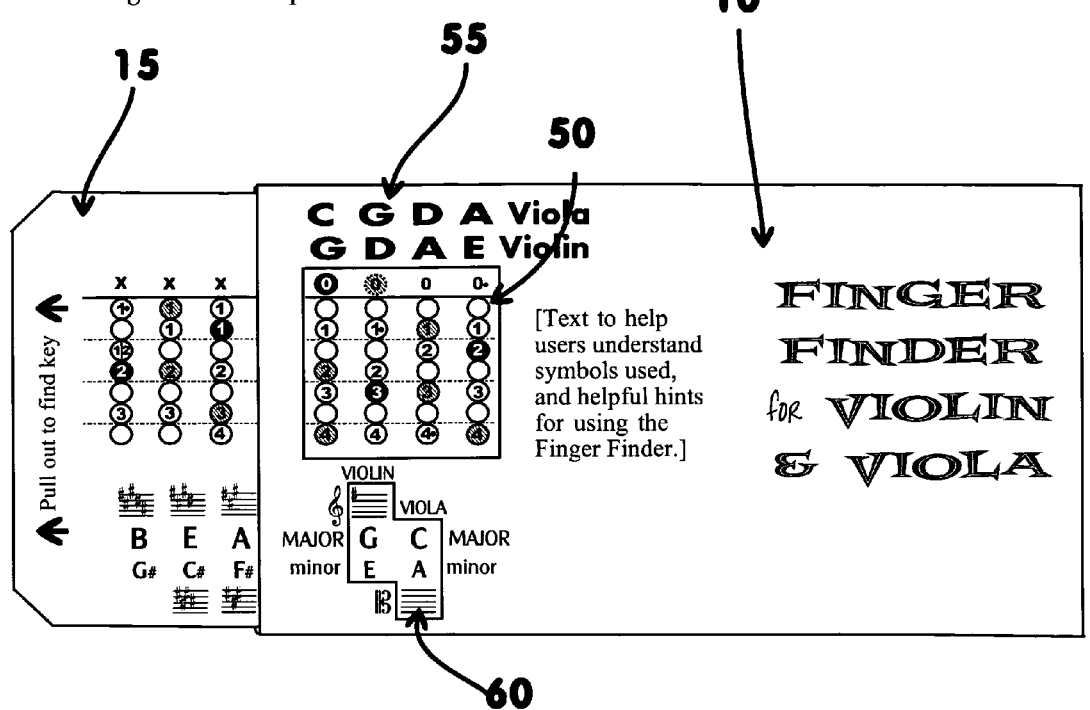
FIG. 4 shows a variant of the fingering guide as adapted to show information for both the violin and viola on the same card. This figure shows a sample of imprinting on the front 10 of the outer sleeve, and the circles and colors on the sliding card 15 which show through the larger window 50, while information regarding the key signature or name of the key being looked up can be found showing through the smaller window 60 which in this variant is a double or staggered window showing information for the violin vertically on the left side of the window, and information for viola vertically displayed on the right side. The names of the strings are shown 55 across the top of the larger window, indicating one row of string names for viola and below it, a second row of string names usable for the violin.
Figure 5:
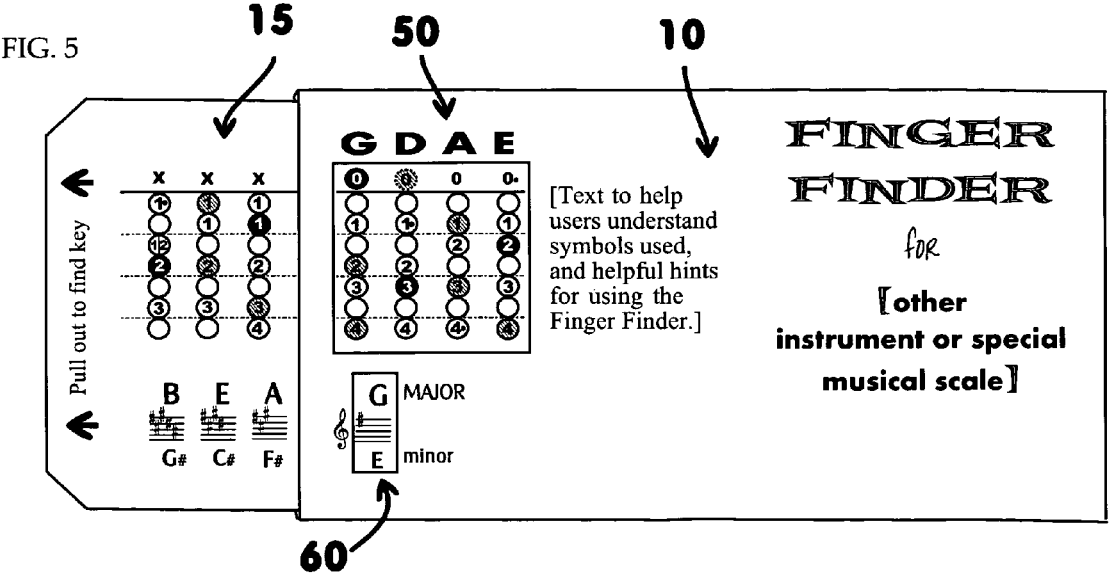
FIG. 5 shows a variant of the fingering guide as adapted to show information for various musical scales and patterns playable on the violin or related instruments. Shapes on the sliding card 15 show through the window 50 on the outer sleeve to illustrate fingering positions, while information labeling each type of scale or key is revealed in a smaller window 60. Information is imprinted on the front 10 and back to help the user.

3. Finger Finder for Violin & Viola, a slightly larger item which has a single card covering fingerings for both instruments. The small window opening is adjusted to allow the addition of the alto clef key signature. This variant of the fingering guide may be adapted as shown in FIG. 4 to show information for both the violin and viola on the same card. This figure shows a sample of imprinting on the front 10 of the outer sleeve, and the circles and colors on the sliding card 15 which show through the larger window 50, while information regarding the key signature or name of the key being looked up can be found showing through the smaller window 60 which in this variant is a double or staggered window showing information for the violin vertically on the left side of the window, and information for viola vertically displayed on the right side. The names of the strings are shown 55 across the top of the larger window, indicating one row of string names for viola and below it, a second row of string names usable for the violin.

What is claimed is:

1. A stringed instrument fingering guide, comprising a windowed sleeve and a card slidable in the sleeve;

said card imprinted with fingering information in a first region, and musical key information in a second region, arranged such that the fingering information corresponding to a key is a contiguous area of said card that is visible through the windowed sleeve when that key information appears in a window of the sleeve wherein the fingering positions displayed through the sleeve window form columns of entries, each column corresponding to positions on one string, entries listing only the finger to use and the relative position, and wherein changing key involves displacing columns to represent a different string, covering one displayed column and uncovering a not displayed column.

2. The stringed instrument fingering guide of claim 1, wherein the windowed sleeve has a first window in which the fingering information appears, and a second window in which musical key information appears as the card slides in the sleeve.

3. A stringed instrument fingering guide of claim 1, having separate cards for different hand positions.

4. A stringed instrument fingering guide of claim 1, wherein the fingering information includes shapes vertically aligned to indicate all possible finger positions within a hand's reach on each string.

5. A stringed instrument fingering guide of claim 4, wherein the fingering information includes a number for the finger used to play each scale note in the musical key visible through the smaller opening on the sleeve, with said numbers representing the appropriate fingers to be used in said locations.

6. A stringed instrument fingering guide of claim 4, wherein certain shapes filled in with a color to indicate a root note of a musical key indicated through the smaller opening on the outer sleeve.

7. A stringed instrument fingering guide of claim 4, wherein certain shapes filled in with different colors indicate root notes of major and minor keys visible through the smaller opening on the outer sleeve.

8. A stringed instrument fingering guide of claim 4, wherein certain shapes filled in with a color indicate the third and fifth notes of a major scale in the musical key indicated through the smaller opening on the outer sleeve.

9. A stringed instrument fingering guide as described in claim 1, wherein straight horizontal lines indicate boundaries between positions normally covered by one finger, and the positions normally covered by the next finger.

10. A stringed instrument fingering guide as described in claim 1, wherein a mark at the top of the vertically aligned fingering indicates whether the open string can be used in the musical key indicated through the smaller opening on the outer sleeve.

11. A stringed instrument fingering guide as described in claim 1, wherein one or more additional cards bear information corresponding to one or more scales, modes, and ethnic styles that can be played on the instrument.

12. A stringed instrument fingering guide as described in claim 2, wherein the sleeve includes string names aligned above the first window.

13. A string instrument fingering guide for use with a fretless instrument such as a violin, viola, cello or the like includes a flat sleeve having first and second windows, and a card that slides within the sleeve bearing musical indicia for fingering position and musical key in positions effective to display correlated information in the first and second windows, respectively, wherein the fingering positions in the first window displays 4 or more columns of fingering positions, each column having entries corresponding to positions on one playable string, correlated to playable positions on one or more instruments in the instrument family including a violin, a viola, and a cello, wherein changing key involves displacing columns to represent a different string, covering one displayed column and uncovering a not displayed column.

14. The string instrument fingering guide of claim 13, wherein the correlated information includes a musical key, and the fingering positions for the instrument that are associated with the key.

15. The instrument fingering guide of claim 14, wherein the correlated information further includes markings such as color to identify finger positions corresponding to notes such as the third or fifth of a key, or the root of a minor key.

16. The instrument fingering guide of claim 13, further including an indication whether an open string note is in the displayed key.

* * * * *